2,945,022
Patented July 12, 1960

1

2,945,022

MONOAZO AND DISAZO TRIAZINE DYES

Alfred Fasciati, Bottmingen, Raymond Gunst, Binningen, Henri Riat, Arlesheim, and Karl Seitz, Neu-Allschwil, Switzerland, assignors to Ciba Limited, Basel, Switzerland, a Swiss firm No Drawing. Filed Sept. 9, 1957, Ser. No. 682,583

Claims priority, application Switzerland Sept. 14, 1956

8 Claims. (Cl. 260—153)

The present invention provides new, valuable azo dyestuffs containing at least two strongly acid, water-solubilizing groups and in addition a 2-halogen-4-amino-1:3:5-triazine radical attached to the radical of an azo component of the benzene series by way of an amino bridge, preferably a bridge of the formula

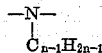

in which n indicates a positive whole number. The invention is concerned especially with such mono- and disazo dyestuffs as contain a 2-chloro-4-amino-1:3:5-triazine radical of which the amino group is a —NH₂— group or the radical of an amine containing at most 12 carbon atoms, which preferably contains an acid water-solubilizing group, i.e. a carboxyl or sulfonic acid group if it comprises an aromatic six-membered ring.

Among these dyestuffs primarily the metal-free dyestuffs are of value which correspond to the formula (1)    D—N=N—A—NH—X

in which X indicates a 2-halogen-4-amino-1:3:5-triazine radical, preferably a 2-chloro-4-amino-1:3:5-triazine radical attached in 6-position to the NH— group, of which the amino group contains at most 12 carbon atoms and when it is an aryl amino group, also contains a sulfonic acid group, D is the radical of a diazo component, if desired containing azo groups and A is a benzene radical attached to the —NH—X— group in p-position to the azo group and in which D and X together contain at least two strongly acid water-solubilizing groups.

The characteristic monohalogen-triazine grouping is attached to the radical of the azo component by way of an amino bridge which is attached to the benzene radical A either directly or by way of a bridge member, for example an alkylene radical. The radical D can be an unsubstituted phenyl radical or a methyl, alkoxy, chloro or nitrophenyl radical or a still larger radical, for example a naphthalene radical or a bicyclic radical, if desired containing azo groups.

Together with a monohalogen-triazine substituent of the specified type, the dyestuffs of the invention also contain at least two strongly acid water-solubilizing groups such as carboxyl or more especially sulfonic acid groups. Advantageously the dyestuffs contain more than one such group per azo group, i.e. at least two such groups are present in a monoazo dyestuff and at least three in a

2 disazo dyestuff. These water-solubilizing groups can be distributed in any manner in the dyestuff molecule.

For the manufacture of the dyestuffs of this invention it is possible to proceed from corresponding dyestuffs, prepared by methods of known type, containing a dihalogen-, especially a dichloro-1:3:5-triazine radical, and in such dichloro-triazine dyestuffs to replace one of the two chlorine atoms, for example by reaction with ammonia or with an amine containing at most 12 carbon atoms and also containing a carboxyl or sulfonic acid group if it comprises an aromatic nucleus, by a corresponding radical, i.e. by an amino group. The dihalogen-triazine dyestuffs to be used in this case can be obtained by methods of known type by reaction of azo dyestuffs containing an acylatable amino group in the radical of an azo component of the benzene series, with cyanuric halides, especially with cyanuric chloride (2:4:6-trichloro-1:3:5-triazine) in the molecular proportion of at least 1:1 or from the corresponding dyestuff components containing dichlorotriazine radicals.

For the production of the starting dyestuffs which contain the acylatable amino group in an azo component of the benzene series, there are concerned, for example, amino benzenes which are capable of coupling owing to the presence of an amino group which is at most secondary. As such azo components may be mentioned for example: ω-methane sulfonic acid derivatives of aniline, of o-methoxy-aniline and of o-amino-benzene carboxylic acid (in which case for the purpose of liberation of the amino group after the dyestuff production the ω-methane sulfonic acid is hydrolytically split off), also m-toluidine and 3-acylamino-1-amino-benzenes, e.g. 3-acetylamino-1-aminobenzene, 3-hydroxyacetylamino-1-aminobenzene, 3-carbethoxyamino-1-aminobenzol, 1-amino-2-methyl-5-methoxy-benzene, 1-amino-2:5-dimethoxy- or -diethoxy-benzene, 1-amino-3-methoxybenzene and 1-amino-2-methoxy-5-isopropyl-benzene.

The diazo components to be coupled with these azo components can contain non-water-solubilizing substituents, if desired also azo groups and must contain strongly acid water-solubilizing substituents such as sulfonic acid groups. These diazo components can also either be relatively simple compounds, for example aminobenzene sulfonic acids, amino naphthalene sulfonic acids, amino pyrene- or -chrysene sulfonic acids, amino naphthol sulfonic acids or amino phenol sulfonic acids, or complicated diazotizable compounds containing, for example, one or two azo groups.

As examples of amines of which the diazo compounds are applicable for coupling with the specified azo components containing acylatable amino groups, for example the following amino sulfonic acids may be mentioned:

1-aminobenzene-2-, -3- or -4-sulfonic acid,
2-amino-1-methoxybenzene-4-sulfonic acid,
3-amino-2-hydroxy-benzoic acid-5-sulfonic acid,
3-amino-6-hydroxy-benzoic acid-5-sulfonic acid,
2-aminophenol-4-sulfonic acid,
5-acetylamino-2-aminobenzene-1-sulfonic acid,
4-acetylamino-2-aminobenzene-1-sulfonic acid,
5-acetylamino- or 5-benzoylamino-2-aminobenzene-1-carboxylic acid,
2-aminobenzoic acid-4- or -5-sulfonic acid,
1-aminonaphthalene-4-, -5-, -6- or -7-sulfonic acid,
2-aminonaphthalene-4-, -6-, -7- or -8-sulfonic acid,
1-aminonaphthalene-3:6-disulfonic acid,
1-aminobenzene-2:5-disulfonic acid,
2-aminonaphthalene-4:8-, -5:7- or -6:8-disulfonic acid, 1-(3'- or 4'-aminobenzoyl)-aminobenzene-3-sulfonic acid,
3-aminopyrene-8- or -10-monosulfonic acid,
3-aminopyrene-5:8- or 5:10-disulfonic acid,
4-nitro-4'-aminostilbene-2:2'-disulfonic acid, and also
O-acyl-derivatives of aminonaphthol-sulfonic acids, for example the O-acyl derivatives of 1-amino-8-hydroxynaphthalene-3:6- or -4:6-disulfonic acid, dehydrothiotoluidine-mono- or -disulfonic acid and so on.

There are also concerned as diazo components such amino azo dyestuffs as are obtained by sulfonation of azo dyestuffs containing a diazotizable amino group or a substituent convertible into such a group after the sulfonation operation, for example a nitro group or an R—CO—NH— group, in which R indicates an aryl radical. As such may be mentioned, for example, the amino mono azo dyestuffs obtainable by sulfonation, for example, of amino azo benzene or amino azo salicylic acids.

There are further concerned as diazo components for the manufacture of dyestuffs of the Formula 1 amino mono azo dyestuffs containing sulfonic acid groups that can be produced, for example, by coupling of diazotized mono acyl derivatives of aromatic diamines with azo components containing an aromatic hydroxyl group or a keto methylene group and subsequent hydrolysis of the resulting acylamino monoazo dyestuffs, for example the amino monoazo dyestuffs obtainable by hydrolysis of the monoacyl diamino-stilbene disulfonic acids and the like from phenols, naphthols, 5-pyrazolones, barbituric acids, hydroxyquinolines, β-keto carboxylic acid derivatives and diazotized monoacyl diamino benzenes. There are also suitable as diazotizable aminoazo dyestuffs coupling products from one of the mentioned coupling components containing $NH_2$— groups with the diazo compounds of the likewise mentioned amino sulfonic acids.

In this case preferably such starting materials are combined as lead to amino azo dyestuffs with at least two water-solubilizing groups.

The coupling of the diazo compounds, obtained for example by means of mineral acid, especially hydrochloric acid, and sodium nitrite, with the mentioned amines of the benzene series, likewise takes place by methods of known type.

Prior to the condensation of the resulting aminoazo dyestuffs with cyanuric chloride, the dyestuffs can if desired, for the introduction of an amino benzoyl group, to be condensed with 3- or 4-nitro benzoyl chloride and after nitrobenzoylation the nitro group converted into an amino group by reduction.

The condensation of the resulting aminoazo dyestuffs with cyanuric chloride is to be carried out in such a manner that in the resulting condensation product two replaceable halogen atoms remain of which one is replaced according to the present invention by the radical of an amino compound of the specified type. As such amino compounds are here concerned ammonia and amines such as methyl, dimethyl, ethyl, diethyl, propyl, isopropyl, butyl, isobutyl, hexyl or cyclohexyl-amine and also β-chlorethylamine, piperidine, morpholine, γ-methoxy-propylamine, methoxy-ethylamine, ethanolamines, propanolamines and acylated amines such as acetamide, butyric acid amide, urea, thiourea, hydrazine, thiosemicarbazide and toluene sulfonic acid amide, also glycocoll, amino-carbonic acid esters such as the methyl or ethyl ester, amino acetic acid ethyl ester, aminoacetamide and especially 1-aminobenzene-2:5-disulfonic acid, 1-amino benzene-2-, -3-, or -4-sulfonic acid, 1-amino benzene-2-, -3-, or -4-carboxylic acid, amino naphthalene mono and disulfonic acid, 1-amino diphenyl-4'-sulfonic acid, β-amino-ethane sulfonic acid and N-methylamino ethane sulfonic acid. Only the latter amines containing water-solubilizing groups are concerned when as starting materials dyestuffs are used which contain only one water-solubilizing group.

The condensation, according to the invention, of these amino compounds with dihalogen-triazine dyestuffs is advantageously carried out with the use of acid-binding agents such as sodium acetate, sodium carbonate or sodium hydroxide, and under such conditions that in the product produced one replaceable halogen atom remains, i.e., for example, in organic solvents or at relatively low temperatures in aqueous agents.

The azo dyestuffs of this invention can likewise be prepared by means of a modification of the process described immediately above. This modification of the process consists in that the azo dyestuffs applicable as starting materials for the manufacture of the dichloro-triazine dyestuffs, which contain an acylatable amino group, for example the aminoazo dyestuffs obtainable from the components set forth above, are condensed with 2:4-dichloro-6-amino-1:3:5-triazines in such a manner that in the resulting condensation product together with at least two water-solubilizing groups a replaceable halogen atom is also present.

Suitable 2:4-dihalogen-1:3:5-triazines can be prepared by methods of known type from cyanuric halides such as cyanuric bromide or cyanuric chloride, for example by reacting 1 mol of cyanuric chloride with 1 mol of ammonia or with 1 mol of the amines set forth above. The resulting dihalogen-triazine compounds can for the production of the azo dyestuffs of this invention be condensed with already produced aminoazo dyestuffs of the specified type containing an acylatable amino group.

In the production of the dyestuffs of the invention by condensation of one of the specified aminoazo dyestuffs with cyanuric chloride and one of the likewise specified simpler amino compounds, in most cases the sequence of the condensations can be selected as desired.

In spite of the presence of labile halogen atoms in the dyestuffs of this invention they can, without loss of their valuable properties, be isolated and worked up to useful, dry dye preparations. The isolation in the process of the invention preferably takes place at as low a temperature as possible by salting out and filtration. The filtered dyestuffs can be dried, if desired after the addition of color stretching agents and/or of buffer substances such as mixtures of equal parts of mono- and di sodium phosphates. The drying is preferably carried out at not too high temperatures and under reduced pressure. In some cases dry preparations can be obtained by spray drying of the whole reaction mixture obtained according to the invention, i.e. without intermediate isolation of the dyestuffs.

The new dyestuffs of the invention are suitable for the dyeing and printing of a wide variety of materials, especially cellulosic materials of fibrous structure, such as linen, regenerated cellulose and primarily cotton. They are especially suitable for dyeing by the so-called pad dyeing process, according to which the goods are impregnated with aqueous dyestuff solutions, if desired also containing salt, and the dyestuffs fixed, preferably in the hot, after an alkali treatment. This process and the direct dye method which is also applicable in the case of many of the dyestuffs obtained by the present process, give valuable dyeings, fixed fast to washing, while by the printing process fast prints are obtained.

When the dyestuffs contain metal-complex forming groups, for example o:o'-dihydroxy azo groupings or o-hydroxycarboxy groupings, as for example in the case of salicylic acid radicals, the dyeings obtained therewith can be treated with agents providing metal, for example agents providing chromium but preferably agents providing nickel and copper. The treatment with the agents providing metal can be carried out by methods of known type. If desired, very valuable dyeings can be obtained by operating in accordance with the process in which the dyeings produced with the metal-free dyestuffs are after-treated with aqueous solutions containing water-soluble compounds, especially complex copper compounds, and basic formaldehyde condensation products from compounds containing at least once in the molecule the atom grouping

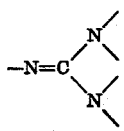

or compounds, for example cyanamide, that can easily be converted into such compounds.

The dyeings obtainable with the new dyestuff preparations upon the cellulosic fibers, and also corresponding prints, are distinguished as a rule by the purity of their color shade, by a good fastness to light and primarily by outstanding fastness to wet processing, especially a very good fastness to washing.

The following examples illustrate the invention, the parts and percentages being by weight unless otherwise stated and the relation between part by weight and part by volume being the same as that between the kilogram and the liter.

EXAMPLE 1

45.1 parts of the amino-disazo dyestuff obtained by coupling diazotized 2-aminonaphthalene-4:8-disulfonic acid with 1-amino-2-methoxy-5-methylbenzene, are dissolved in 1500 parts of water and sufficient sodium hydroxide to form a neutral solution. This is treated with an ice-cold aqueous suspension of 18.5 parts of cyanuric chloride. Then about 100 parts of N-sodium hydroxide solution are gradually added dropwise so that the reaction mixture reacts weakly acid or neutral. When free amino group can no longer be detected, a solution is added, neutralized with sodium carbonate, from 17.3 parts of 1-aminobenzene-3-sulfonic acid, a further 10 parts of sodium bicarbonate are added and the whole is stirred for several hours at 30–40° C. until the condensation is complete. The dyestuff is salted out, filtered off and dried. It dyes cotton from a bath containing much salt, in the presence of alkali, in reddish yellow shades fast to light and washing.

The sequence of the condensations can also be reversed, i.e. by first reacting the 1-aminobenzene-3-sulfonic acid with the cyanuric chloride and condensing the resulting primary condensation product with the mono azo dyestuff.

EXAMPLE 2

30.3 parts of 2-aminonaphthalene-4:8-disulfonic acid are diazotized in the presence of hydrochloric acid with 6.9 parts of sodium nitrite. The diazo compound is coupled in acetic acid solution with 15 parts of 1-amino-3-acetylaminobenzene. The monoazo dyestuff formed is salted out, filtered off and dissolved in 2,000 parts of water. The solution, neutralized with sodium carbonate is allowed to run into an ice-cold suspension of 18.4 parts of cyanuric chloride in 200 parts of water and stirring is carried out for 30 minutes at 0–5° C. Then about 50 parts by volume of 2 N-sodium carbonate solution are introduced dropwise in such a manner that the reaction mixture continuously exhibits a weakly acid reaction (pH 5.5–6). When free amino group can no longer be detected, 35 parts of 10% ammonia solution are introduced and stirring carried out for several hours at 30–40° C. The dyestuff is then salted out, filtered off and dried under vacuum. The resulting yellow powder dissolves in water with a yellow color and dyes cotton from a bath containing much salt, in the presence of alkali, in reddish yellow shades very fast to light and washing.

The following table shows the results of condensation by the methods of Examples 1 and 2 of cyanuric chloride on the one hand with the aminoazo dyestuffs obtained by coupling from the dyestuff components mentioned in columns I and II and on the other hand with the amines mentioned in column III. Similar monochlorotriazine dyestuffs are obtained, which dye cotton by the so-called pad dyeing process in the shades set out in column IV.

*Table I*

| | I<br>Diazo component | II<br>Coupling component | III<br>Amine | IV |
|---|---|---|---|---|
| 1 | 2-Aminonaphthalene-4:8-disulfonic acid. | 1-Amino-2-methoxy-5-methyl-benzene. | $NH_3$ | reddish yellow. |
| 2 | ----do---- | ----do---- | n-Butylamine | Do. |
| 3 | ----do---- | ----do---- | n-Hexylamine | Do. |
| 4 | ----do---- | ----do---- | Isobutylamine | Do. |
| 5 | ----do---- | ----do---- | Diethylamine | Do. |
| 6 | ----do---- | ----do---- | 2-Amino-n-butanol | Do. |
| 7 | ----do---- | ----do---- | Dimethylamine | Do. |
| 8 | ----do---- | ----do---- | Cyclohexylamine | Do. |
| 9 | ----do---- | ----do---- | Morpholine | Do. |
| 10 | ----do---- | ----do---- | 1-Aminobenzene-2-sulfonic acid. | Do. |
| 11 | ----do---- | ----do---- | 2-Aminonaphthalene-6-sulfonic acid. | Do. |
| 12 | ----do---- | 1-Amino-2:5-di-methoxy-benzene. | 1-Aminobenzene-2-sulfonic acid. | orange. |
| 13 | ----do---- | 1-Amino-3-methyl-benzene. | $NH_3$ | reddish yellow. |
| 14 | ----do---- | 1-Amino-2-methoxy-benzene. | $NH_3$ | yellow. |
| 15 | 1-Aminonaphthalene-3:6-disulfonic acid. | 1-Amino-2-methoxy-5-methylbenzene. | $NH_3$ | yellowish orange. |
| 16 | 2-Aminonaphthalene-5:7-disulfonic acid. | ----do---- | $NH_3$ | reddish yellow. |
| 17 | 2-Aminonaphthalene-4:8-disulfonic acid. | 1-Amino-3-acetyl-aminobenzene. | Methylamine | Do. |
| 18 | ----do---- | ----do---- | Ethylamine | Do. |
| 19 | ----do---- | ----do---- | Isobutylamine | Do. |
| 20 | ----do---- | ----do---- | Taurine | Do. |
| 21 | ----do---- | ----do---- | 1-Aminobenzene-3-sulfonamide. | Do. |
| 22 | ----do---- | ----do---- | 1-Aminonaphthalene-4-sulfonic acid. | Do. |
| 23 | ----do---- | ----do---- | Butylamine | Do. |
| 24 | ----do---- | ----do---- | Morpholine | Do. |
| 25 | ----do---- | ----do---- | 2-Aminoethanol | Do. |
| 26 | ----do---- | ----do---- | γ-Methoxypropylamine | Do. |
| 27 | ----do---- | ----do---- | 2-Amino-1-propanol | Do. |
| 28 | ----do---- | ----do---- | 1-Amino-2-propanol | Do. |
| 29 | ----do---- | ----do---- | Benzylamine | Do. |
| 30 | ----do---- | ----do---- | 2-Ethylhexylamine | Do. |
| 31 | ----do---- | 3-Aminophenylurea | $NH_3$ | Do. |
| 32 | ----do---- | ----do---- | 1-Aminobenzene-3-sulfonic acid. | Do. |

Table I—Continued

| | I<br>Diazo component | II<br>Coupling component | III<br>Amine | IV |
|---|---|---|---|---|
| 33 | 1 - Aminonaphthalene - 3:6-disulfonic acid. | 1 - Amino - 3 - acetyl - aminobenzene. | NH₃ | reddish yellow. |
| 34 | 2 - Aminonaphthalene - 5:7-disulfonic acid. | ___do___ | NH₃ | Do. |
| 35 | 1 - Aminobenzene - 2:5 - disulfonic acid. | ___do___ | NH₃ | yellow. |
| 36 | 1 - Aminobenzene - 4 - carboxylic acid-3-sulfonic acid. | ___do___ | NH₃ | Do. |
| 37 | 2 - (4' - Aminophenyl) - benzthiazole - X,3' - disulfonic acid. | ___do___ | NH₃ | yellow orange. |
| 38 | ___do___ | ___do___ | 1 - Aminobenzene - 3 - sulfonic acid. | Do. |
| 39 | 2 - Aminonaphthalene - 4:8-disulfonic acid. | 1 - Amino - 3 - methane - sulfonyl - amino - benzene. | NH₃ | reddish yellow. |
| 40 | ___do___ | 1 - Amino - 3 - propionylaminobenzene. | NH₃ | Do. |
| 41 | ___do___ | 1 - Amino - 3 - methyl - benzene. | 2-Aminoethanol | Do. |
| 42 | ___do___ | ___do___ | Isopropylamine | Do. |
| 43 | ___do___ | 1 - Methylamino - 3 - methylbenzene. | NH₃ | Do. |
| 44 | ___do___ | ___do___ | 1 - Aminobenzene - 2 - sulfonic acid. | Do. |
| 45 | ___do___ | 1 - Amino - 2 - methyl - 5 - acetylaminobenzene. | NH₃ | Do. |
|  |  |  |  | Do. |
| 46 | ___do___ | 1 - Amino - 2 - methoxy - 5 - acetyl - amino - benzene. | NH₃ | yellowish orange. |
| 47 | O - Benzene - sulfonyl - ester of 1-amino-8-hydroxynaphthalene-3:6-disulfonic acid. | 1 - Amino - 2 - methoxy - 5-methyl benzene. | NH₃ | reddish orange. |
| 48 | 1 - Aminobenzene - 2 - sulfonic acid. | ___do___ | 1 - Aminobenzene - 2 - sulfonic acid. | reddish yellow. |
| 49 | 2 - Aminonaphthalene - 4:8-disulfonic acid. | ___do___ | 4-Amino-1:1'-diphenyl-4'-sulfonic acid. | Do. |
| 50 | ___do___ | ___do___ | Thiosemicarbazide | Do. |
| 51 | ___do___ | ___do___ | Phenylhydrazine - m - sulfonic acid. | Do. |
| 52 | ___do___ | ___do___ | Amino-acetic acid | Do. |

EXAMPLE 3

17.3 parts of 1-aminobenzene-2-sulfonic acid are dissolved in 300 parts of water with the addition of 5.3 parts of sodium carbonate. The resulting neutral solution is allowed to flow with good stirring into an ice-cold suspension of 18.5 parts of cyanuric chloride and the mineral acid formed is gradually neutralized by addition of dilute caustic soda solution. To the suspension of the resulting primary condensation product is added a neutral solution obtained by dissolving 58.3 parts of the sodium salt of the amindoiazo dyestuff of the formula

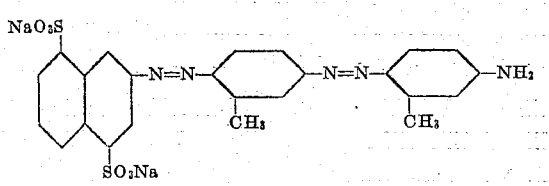

in 2000 parts of water. Stirring is carried out for several hours at 40° C. with gradual neutralization of the mineral acid formed by addition of 10% sodium carbonate solution. When amino group can no longer be detected, the solution is brought to pH 8.5 with sodium carbonate and the dyestuff salted out. After filtration and drying, it forms a dark orange powder and dyes cotton from an alkaline bath containing much salt in yellow orange shades very fast to light and washing.

EXAMPLE 4

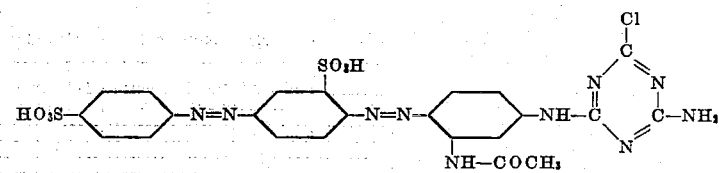

51.8 parts of the aminodisazo dyestuff obtained by coupling the acetic acid solution of diazotized 4-amino-1:1'-azobenzene-3:4'-disulfonic acid with 1-amino-3-acetyl-aminobenzene are dissolved in 3,000 parts of water with the addition of 10.6 parts of anhydrous sodium carbonate. The solution is added to an ice-cold aqueous suspension of 18.4 parts of cyanuric chloride and the mixture well stirred. Then about 100 parts of sodium hydroxide solution are slowly added dropwise, whereby the pH of the reaction mixture is maintained between 6.5 and 7.5. When free amino group can no longer be detected, 35 parts of 10% ammonia solution are added and stirring carried out for 6 hours at 30–40° C. The dyestuff is salted out, filtered and dried. It dissolves in water with an orange color and dyes cotton from an alkaline bath containing much salt in yellow orange shades very fast to light and washing.

By using for the condensation with cyanuric chloride the compounds of column III of Table II below on the one hand and on the other hand the aminoazo dyestuff obtained by coupling one of the azo components of column II with the diazo compounds of the aminoazo dyestuffs mentioned in column I, dyestuffs are obtained which dye cotton in the shades set out in column IV.

Table II

| | I | II | III | IV |
|---|---|---|---|---|
| 1 | 4-Amino-1:1'-azobenzene-3:4'-disulfonic acid | 1-Amino-3-methylbenzene | NH₃ | yellow brown. |
| 2 | do | do | 1-Aminobenzene-4-sulfonic acid | Do. |
| 3 | do | 1-Amino-2:5-dimethylbenzene | NH₃ | Do. |
| 4 | do | do | 1-Aminobenzene-3-sulfonic acid | Do. |
| 5 | do | 1-Amino-2-methoxy-5-methylbenzene | NH₃ | brown orange. |
| 6 | do | do | 1-Aminobenzene-4-sulfonic acid | Do. |
| 7 | do | 1-Amino-3-acetylaminobenzene | 1-Aminobenzene-3-sulfonic acid | yellow orange. |
| 8 | do | do | 1-Aminobenzene-2-sulfonic | Do. |
| 9 | [structure: HO₃S-naphthalene(SO₃H)-N=N-benzene(CH₃)(NH₂)] | 1-Amino-3-methylbenzene | do | Do. |
| 10 | [structure: HO₃S-naphthalene(SO₃H)-N=N-benzene(CH₃)(NH₂)] | do | 1-Aminobenzene-4-sulfonic acid | Do. |
| 11 | [structure: HO₃S-naphthalene(SO₃H)-N=N-benzene(CH₃)(NH₂)] | 1-Amino-3-acetyl-aminobenzene | 1-Aminobenzene-2-sulfonic acid | orange. |
| 12 | [structure: HO₃S-naphthalene(SO₃H)-N=N-benzene(CH₃)(NH₂)] | 1-Amino-2-methoxy-5-methylbenzene | NH₃ | brown orange. |
| 13 | [structure: HO₃S-naphthalene(SO₃H)-N=N-benzene(CH₃)(NH₂)] | do | 1-Aminobenzene-3-sulfonic acid | Do. |
| 14 | [structure: HO₃S-naphthalene(SO₃H)-N=N-benzene(OCH₃)(H₃C)(NH₂)] | 1-Amino-3-methylbenzene | 1-Aminobenzene-2-sulfonic acid | reddish orange. |
| 15 | [structure: HO₃S-benzene-N=N-naphthalene(SO₃H)-NH₂] | Aniline | NH₃ | brown orange. |
| 16 | [structure: naphthalene(OH)(HO₃S)(SO₃H)-N=N-benzene(SO₃H)-NH₂] | 1-Amino-3-methylbenzene | 1-Aminobenzene-3-sulfonic | ruby red. |
| 17 | [structure: benzene(COOH)(HO₃S)-N=N-naphthalene(HO)(HO₃S)-NH₂] | do | NH₃ | red. |

Table II—Continued

| | I | II | III | IV |
|---|---|---|---|---|
| 18 | 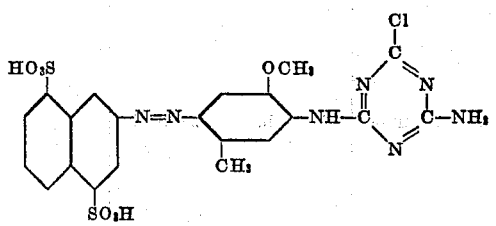 | 1-Amino-3-methylbenzene | 1-Aminobenzene-3-sulfonic acid. | red. |
| 19 | 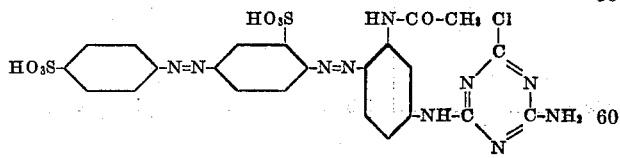 | ....do.... | ....do.... | orange. |

EXAMPLE 5

2 parts of the dyestuff of the formula

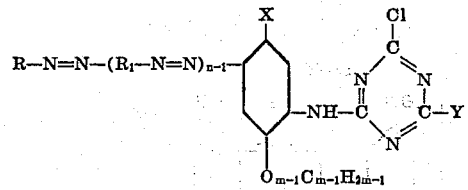

are dissolved in 100 parts of water. A cotton fabric is impregnated with this solution at 60–80° C. on the foulard and the excess liquid is squeezed off so that the material retains 75% of its weight of dyestuff solution.

The goods thus impregnated are dried and then impregnated at room temperature with a solution containing per liter 10 parts of sodium hydroxide and 300 parts of sodium chloride, squeezed off to a liquid retention of 75% and steamed for 60 seconds at 100–101° C. The goods are then rinsed, treated in an 0.5% sodium bicarbonate solution, rinsed, soaped for a quarter of an hour in an 0.3% solution of a non-ionic washing agent at boiling temperature, rinsed and dried. A reddish yellow dyeing, fast to washing and light, is obtained.

EXAMPLE 6

2 parts of the dyestuff of the formula

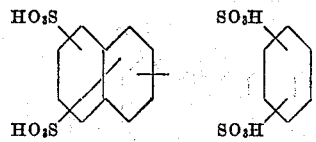

are dissolved in 100 parts of water by boiling. The resulting stock solution is added to 2900 parts of water at 20° C. After the addition of 30 parts of trisodium phosphate and 60 parts of sodium chloride, 100 parts of cotton are entered, the temperature is raised within 45 minutes to 80° C., a further 60 parts of sodium chloride are added and dyeing is continued for 30 minutes at 90–95° C. The dyeing is then rinsed and after treated for 15 minutes in a solution containing 2 grams per liter of sodium carbonate and 3 grams per liter of soap at boiling temperature, rinsed and dried. A powerful orange dyeing results of very good fastness to washing and light.

What is claimed is:

1. An azo dyestuff of the formula $$R-N=N-(R_1-N=N)_{n-1}-\underset{O_{m-1}C_{m-1}H_{2m-1}}{\overset{X}{\underset{|}{C_6H_3}}}-NH-\underset{N}{\overset{C}{\underset{\|}{N}}}\overset{Cl}{\underset{\|}{C}}-Y$$

wherein R is a member selected from the group consisting of the radicals

and

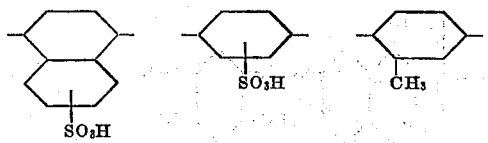

$R_1$ is a member selected from the group consisting of the radicals

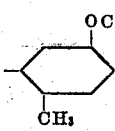

and n and m each represents a whole positive number of at most 2; X is a member selected from the group consisting of the methyl group, the acetylamino group, the propionylamino group, the methanesulfonylamino group and the $H_2N$—CO—NH— group; and Y represents a member selected from the group consisting of the $NH_2$— group, the methylamino group, ethylamino group, n-butylamino group, hexylamino group, isobutylamino group, diethylamino group, hydroxyethylamino group, hydroxybutylamino group, morpholino group, γ-methoxypropylamino group, benzylamino group, hydroxypropylamino group, sulfophenylamino group, sulfonaphthylamino group, carboxymethylamino group and the *m*-sulfophenyl —NH—NH— group.

2. The monoazo dyestuffs according to claim 1, wherein $n$ is 1.

3. A monoazo dyestuff which in its free acid state corresponds to the formula

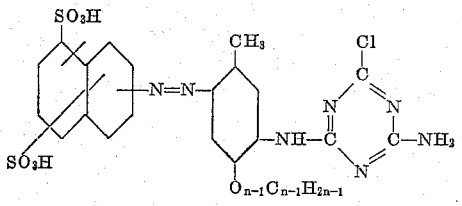

4. The monoazo dyestuff which in its free acid state corresponds to the formula

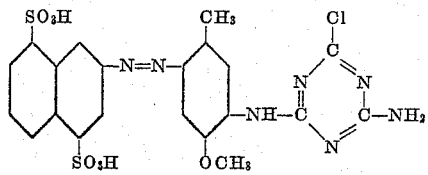

5. The monoazo dyestuff which in its free acid state corresponds to the formula

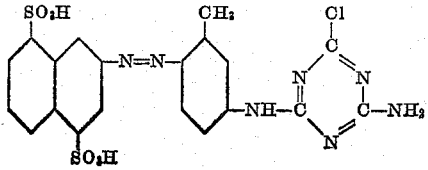

6. The monoazo dyestuff which in its free acid state corresponds to the formula

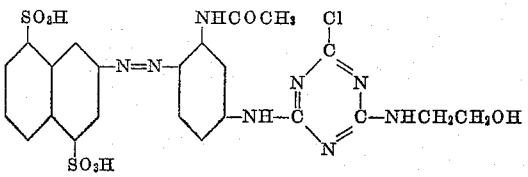

7. The monoazo dyestuff which in its free acid state corresponds to the formula

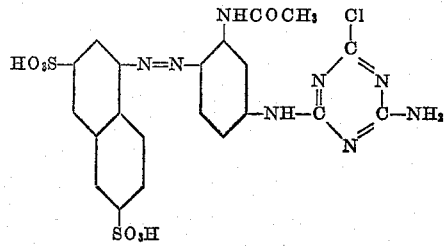

8. The disazo dyestuff which in its free acid state corresponds to the formula

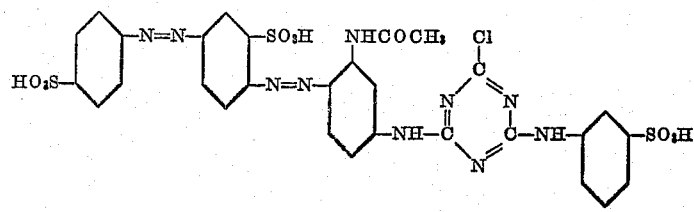

References Cited in the file of this patent

UNITED STATES PATENTS

| | | |
|---|---|---|
| 2,653,149 | Riat | Sept. 22, 1953 |
| 2,679,499 | Long et al. | May 25, 1954 |
| 2,820,785 | Zollinger et al. | Jan. 21, 1958 |